(12) United States Patent
Chang et al.

(10) Patent No.: US 9,091,301 B2
(45) Date of Patent: Jul. 28, 2015

(54) DEFLECTING DEVICE FOR BALL SPLINE DEVICE

(71) Applicant: Hiwin Technologies Corp., Taichung (TW)

(72) Inventors: Che-Kang Chang, Taichung (TW); Zong Sian Jiang, Taichung (TW)

(73) Assignee: Hiwin Technologies Corp., Taichung (TW)

( * ) Notice: Subject to any disclaimer, the term of this patent is extended or adjusted under 35 U.S.C. 154(b) by 52 days.

(21) Appl. No.: 14/146,029

(22) Filed: Jan. 2, 2014

(65) Prior Publication Data

US 2015/0184696 A1    Jul. 2, 2015

(51) Int. Cl.
F16C 29/06 (2006.01)
F16C 33/66 (2006.01)

(52) U.S. Cl.
CPC ......... *F16C 33/6659* (2013.01); *F16C 29/0611* (2013.01); *F16C 29/0685* (2013.01)

(58) Field of Classification Search
CPC ............. F16C 33/6659; F16C 29/0611; F16C 29/0685; F16C 29/0688
See application file for complete search history.

(56) References Cited

U.S. PATENT DOCUMENTS

| | | | | | |
|---|---|---|---|---|---|
| 4,239,299 | A | * | 12/1980 | Hoffmann et al. | 384/43 |
| 4,310,202 | A | * | 1/1982 | Teramachi | 384/45 |
| 4,339,157 | A | * | 7/1982 | Olschewski et al. | 384/43 |
| 5,046,862 | A | * | 9/1991 | Ng | 384/43 |
| 5,695,288 | A | * | 12/1997 | Sugihara et al. | 384/13 |
| 7,523,682 | B2 | | 4/2009 | Liao et al. | |
| 7,934,438 | B2 | | 5/2011 | Chen et al. | |
| 8,051,736 | B2 | | 11/2011 | Chen et al. | |
| 8,342,974 | B2 | * | 1/2013 | Koyagi | 464/168 |
| 2007/0223846 | A1 | * | 9/2007 | Fujii | 384/43 |
| 2012/0201483 | A1 | * | 8/2012 | Yoshida | 384/13 |

* cited by examiner

*Primary Examiner* — Thomas R. Hannon
(74) *Attorney, Agent, or Firm* — Charles E. Baxley

(57) ABSTRACT

A ball spline device includes a guide rail engaged into a sliding member and having a number of longitudinal channels and recesses aligned with each other for engaging with ball bearing members, a cylindrical member and a deflecting device are engaged between the sliding member and the guide rail, and the cylindrical member and the deflecting device each include a number of curved guiding pathway communicating with each other for forming a number of endless ball guiding passages in the ball spline device and for engaging with ball bearing members, and the cylindrical member includes a number of protrusions each having a slot for receiving a lubricating fluid to lubricate the ball bearing members.

6 Claims, 5 Drawing Sheets

US 9,091,301 B2

DEFLECTING DEVICE FOR BALL SPLINE DEVICE

BACKGROUND OF THE INVENTION

1. Field of the Invention

The present invention relates to a lubricating mechanism for a ball spline device, and more particularly to a ball spline device including a lubricating mechanism for suitably and uniformly applying or sending or filling or supplying the lubricant or lubricating oil or fluid to various portions or positions or locations, particularly the endless ball guiding passage or the moving pathway of the ball bearing members and for suitably lubricating the ball bearing members of the ball spline device.

2. Description of the Prior Art

Various kinds of typical linear motion guide devices or ball spline devices have been developed and comprise a slider or follower or slide block or sliding member slidably attached or engaged onto a guide rail or elongated rod or shaft and movable along the guide rail, one or more endless ball guiding passages or moving pathways formed in the ball spline device for slidably receiving ball bearing members, and for facilitating the sliding movement between the slider and the guide rail and for allowing the slider and the guide rail to be smoothly moved relative to each other, and one or more ball return pipes or ball deflecting devices attached onto the ball spline device for guiding the ball bearing members to smoothly and suitably move through the endless ball guiding passages or moving pathways of the ball spline device.

For example, U.S. Pat. No. 7,523,682 to Liao et al., U.S. Pat. No. 7,934,438 to Chen et al., and U.S. Pat. No. 8,051,736 to Chen et al. disclose several of the typical ball screw return systems each comprising a slider or nut slidably attached onto a screw, a ball bearing members or a number of ball bearing members disposed and engaged between the slider and the screw and engaged in the endless ball guiding raceway for facilitating the sliding movement between the slider and the screw and for allowing the slider and the screw to be smoothly moved relative to each other.

Normally, the slider and the screw and/or the ball bearing members or members are moved in a fast speed relative to each other, and a lubricating device is required to be provided or disposed or engaged in the slider and/or the screw for filling or supplying the lubricant or lubricating oil or fluid into the endless ball guiding raceway and the slider and for suitably lubricating the ball bearing members or the like.

However, the lubricant or lubricating oil or fluid is normally required to be filled or supplied into the endless ball guiding raceway with a greater or higher pressure, and the lubricant or lubricating oil or fluid may have a good chance to flow out through the gaps formed between the parts or elements of the ball screw devices. In addition, the lubricant or lubricating oil or fluid may not be suitably and uniformly sent or applied or supplied to various portions or positions or locations of the ball screw devices.

The present invention has arisen to mitigate and/or obviate the afore-described disadvantages of the conventional lubricating mechanisms or devices for the ball screw devices.

SUMMARY OF THE INVENTION

The primary objective of the present invention is to provide a lubricating mechanism including a lubricating mechanism for suitably and uniformly applying or sending or filling or supplying the lubricant or lubricating oil or fluid to various portions or positions or locations, particularly the endless ball guiding passage or the moving pathway of the ball bearing members and for suitably lubricating or greasing the ball bearing members of the ball spline device.

In accordance with one aspect of the invention, there is provided a ball spline device comprising an elongated guide rail including a number of longitudinal channels formed therein, a sliding member including a bore formed therein for receiving and engaging with the guide rail, and including a number of swellings extended radially and inwardly into the bore of the sliding member and equally spaced from each other, and including a number of longitudinal recesses formed in the swellings and communicating with the bore of the sliding member and aligned with the longitudinal channels of the guide rail, a cylindrical member and a deflecting device engaged between the sliding member and the guide rail, and the cylindrical member and the deflecting device each including a compartment formed therein for slidably receiving the guide rail and for allowing the cylindrical member and the deflecting device to be moved along the guide rail, the cylindrical member and the deflecting device each including a number of protrusions extended radially and outwardly therefrom and equally spaced from each other and engaged between the swellings of the sliding member, the cylindrical member and the deflecting device each including a number of curved guiding pathway formed therein, and the curved guiding pathways of the cylindrical member and the deflecting device being communicating with each other for forming a number of endless ball guiding passages in the ball spline device, and a number of ball bearing members engaged in the endless ball guiding passages, and the cylindrical member including a slot formed in each of the protrusions of the cylindrical member, and the cylindrical member including a lateral communicating passageway formed in the protrusions and communicating with the slots and the curved guiding pathways of the cylindrical member, and the cylindrical member including an entrance formed therein and communicating with one of the slots of the cylindrical member for supplying a lubricating fluid into the slots and the curved guiding pathways of the cylindrical member.

The curved guiding pathways of the cylindrical member each include a first longitudinal groove portion and a second longitudinal groove portion, and a curved communicating groove portion communicating with the first and the second longitudinal groove portion respectively, the first longitudinal groove portion of the cylindrical member is communicating with the compartment of the cylindrical member and aligned with and communicating with the recesses of the sliding member and the channels of the guide rail respectively for slidably receiving and engaging with the ball bearing members, and the second longitudinal groove portions of the cylindrical member is formed and located in the protrusions and offset from the compartment of the cylindrical member and offset from the recesses of the sliding member and the channels of the guide rail, and communicating with the first longitudinal groove portions and the curved communicating groove portion of the cylindrical member for slidably receiving and engaging with the ball bearing members.

The sliding member includes two retaining rings engaged in end portions of the sliding member respectively and engaged with the cylindrical member and the deflecting device for retaining and positioning the cylindrical member and the deflecting device in the sliding member.

The deflecting device includes a slot formed in each of the protrusions of the deflecting device and aligned with the slot of the cylindrical member, and the cylindrical member and the deflecting device include a length (L) greater than a length (H) of the slot of the cylindrical member and the deflecting device in the range between 40-97%.

The slots of the cylindrical member are located at a distance away from the center (O) of the guide rail, and each slot of the cylindrical member include a width occupying an included angle (A) relative to the guide rail in the range between 2-30 degrees.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 1:
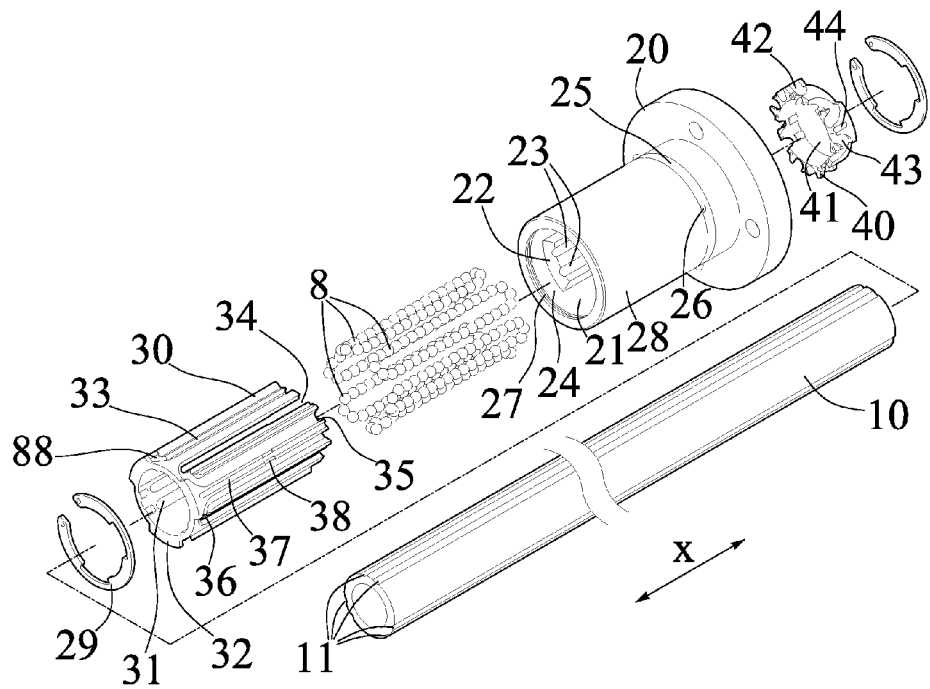
FIG. 1 is a partial exploded view of a ball spline device including an improved lubricating mechanism in accordance with the present invention.
Figure 2:
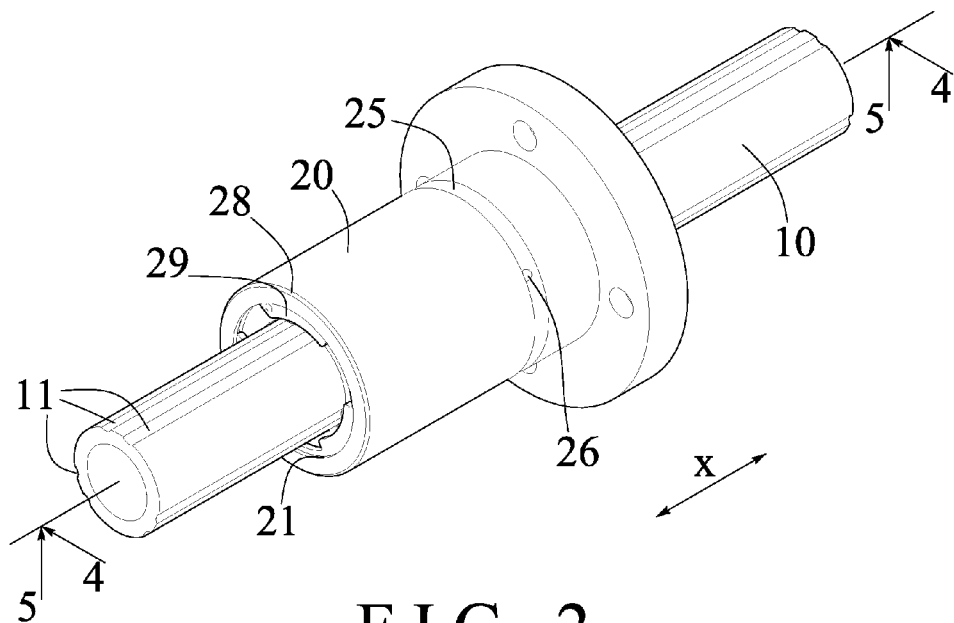
FIG. 2 is a perspective view of the ball spline device.
Figure 3:
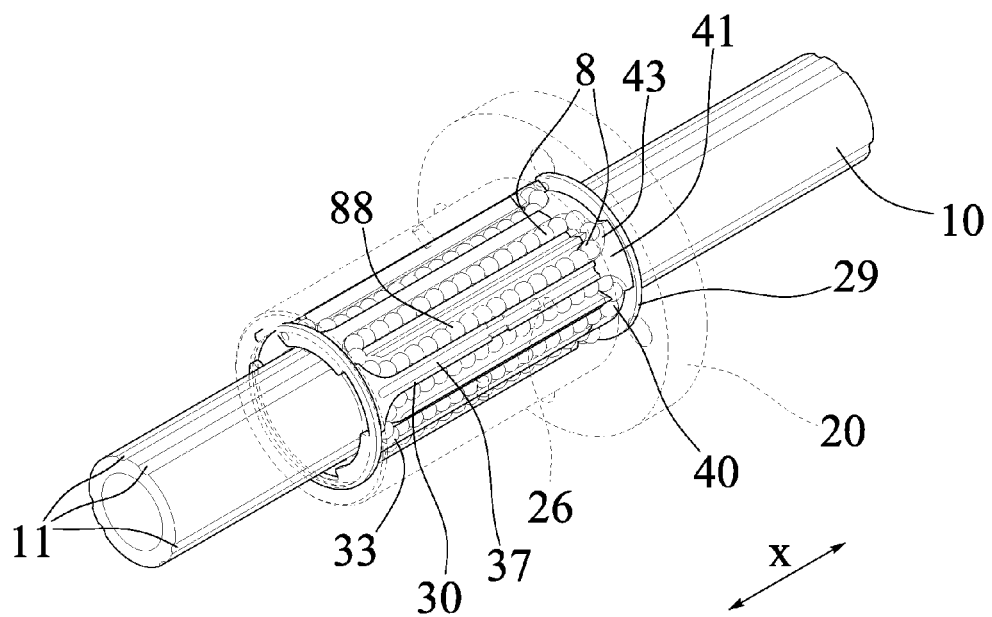
FIG. 3 is another perspective view of the ball spline device, in which the sliding member or the slider has been shown in dotted lines for showing the inner structure of the ball spline device.

Referring to the drawings, and initially to FIGS. 1-5, a ball spline device in accordance with the present invention comprises an elongated bolt or spline or shaft or guide rail 10 including one or more (such as three) pairs, or one or more (such as six) longitudinal recesses or slots or grooves or channels 11 formed therein, such as formed on the outer peripheral portion thereof and arranged along an X-axis for slidably receiving or engaging with the ball bearing members 8. The ball spline device further comprises a slider or sliding member 20 including a compartment or chamber or bore 21 formed therein for slidably receiving or engaging with the elongated guide rail 10 and for allowing the sliding member 20 to be slid and moved along the guide rail 10, and including one or more (such as three) bulges or protrusions or swellings 22 extended radially and inwardly into the bore 21 of the sliding member 20 (FIGS. 6-8) and equally spaced from each other.

Figure 4:
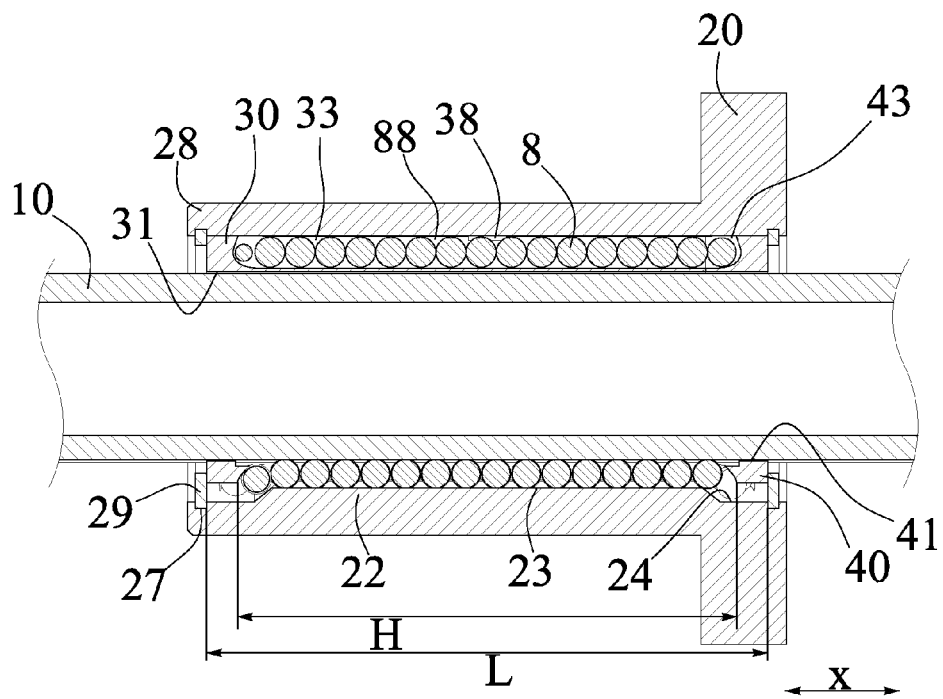
FIGS. 4, 5 are partial cross sectional views of the ball spline device taken along lines 4-4, and 5-5 of FIG. 2 respectively.
Figure 5:
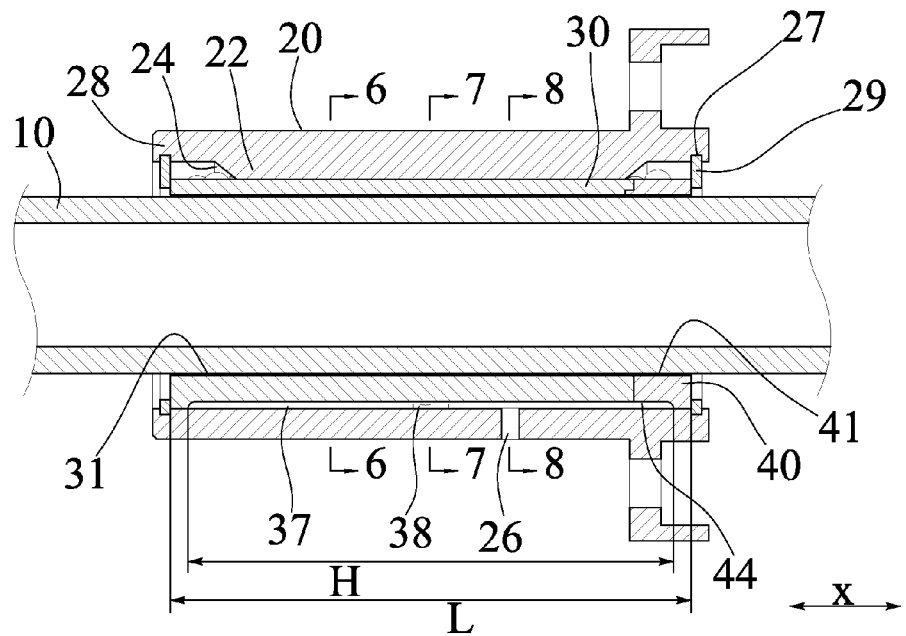

The sliding member 20 further includes one or more (such as two) longitudinal depressions or grooves or channels or recesses 23 formed therein, such as formed in each of the swellings 22 and communicating with the bore 21 of the sliding member 20 and arranged along the X-axis and faced or directed toward and aligned with the longitudinal channels 11 of the guide rail 10 respectively and for forming or defining one or more (such as three) pairs of, or one or more (such as six) ball rolling passages 80 (FIGS. 6-8) between the sliding member 20 and the guide rail 10 and for slidably receiving or engaging with the ball bearing members 8, the swellings 22 are shorter than the sliding member 20 for forming or defining a chamber or compartment or notch 24 in each of the end portions of the swellings 22 and between the swellings 22 and the sliding member 20 (FIGS. 1, and 4-5).

It is preferable, but not necessary that the sliding member 20 includes a peripheral depression 25 formed in the outer peripheral portion of the sliding member 20 for receiving or engaging with a lubricant or lubricating oil or fluid (not illustrated) or the like. The sliding member 20 further includes an inlet or entrance 26 formed therein (FIGS. 1-2, 5), such as also formed in the outer peripheral portion of the sliding member 20 and formed through one of the swellings 22 (FIG. 5) and communicating with the bore 21 of the sliding member 20, and also communicating with the peripheral depression 25 of the sliding member 20 for receiving the lubricant or lubricating oil or fluid from the peripheral depression 25 of the sliding member 20 and for applying or sending or filling or supplying the lubricant or lubricating oil or fluid into the bore 21 of the sliding member 20.

The sliding member 20 further includes an inner peripheral groove or channel or recess or depression or slot 27 formed in each of the end portions 28 of the sliding member 20 and communicating with the bore 21 of the sliding member 20 for receiving or engaging with a clamping or anchoring or retaining ring 29. The ball spline device in accordance with the present invention further comprises a ferrule or conduit or sleeve or barrel or cylindrical member 30 and a deflecting device 40 having a diameter (D, FIG. 7) smaller than the inner diameter of the sliding member 20 and greater than the outer diameter of the guide rail 10 for being disposed or engaged between the sliding member 20 and the guide rail 10, and the retaining rings 29 are contacted or engaged with the cylindrical member 30 and the deflecting device 40 respectively for solidly and stably anchoring or retaining or positioning the cylindrical member 30 and the deflecting device 40 between the sliding member 20 and the guide rail 10.

The cylindrical member 30 and the deflecting device 40 each include a bore or chamber or compartment 31, 41 formed therein for slidably receiving or engaging with the elongated guide rail 10 and for allowing the cylindrical member 30 and the deflecting device 40 to be slid and moved along the guide rail 10, the cylindrical member 30 and the deflecting device 40 each include one or more (such as three) protrusions 32, 42 extended radially and outwardly therefrom and equally spaced from each other and slidably received or engaged or anchored or retained or positioned between the swellings 22 of the sliding member 20 respectively for preventing the cylindrical member 30 and the deflecting device 40 from being pivoted or rotated relative to the sliding member 20 and for allowing the sliding member 20 and the cylindrical member 30 and the deflecting device 40 to be slid and moved in concert along the guide rail 10.

The cylindrical member 30 includes a length greater than that of the deflecting device 40. The cylindrical member 30 and the deflecting device 40 each include one or more (such as three) pairs, or one or more (such as six) curved guiding recesses or depressions or channels or slots or grooves or pathways 33, 43 formed therein and communicating with each other (FIG. 3) for forming or defining one or more (such as six) endless ball guiding passages 88 in the ball spline device and for slidably receiving or engaging with the ball bearing members 8. The curved guiding pathways 33 of the cylindrical member 30 each include a first longitudinal groove portion 34 and a second longitudinal groove portion 35 (FIGS. 6-8) and a curved communicating groove portion 36 (FIG. 1) formed therein.

Figure 6:
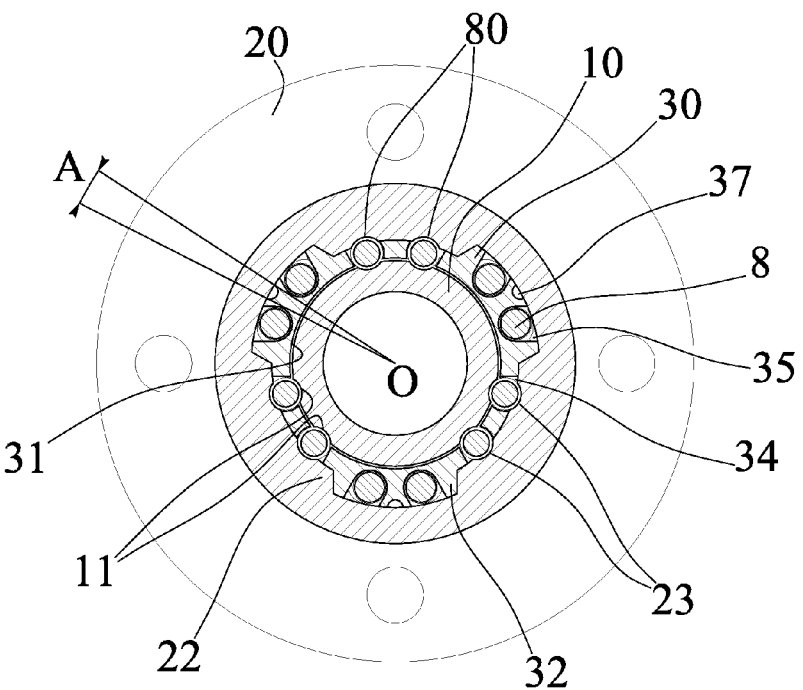
FIGS. 6, 7, 8 are cross sectional views of the ball spline device taken along lines 6-6, 7-7, and 8-8 of FIG. 5 respectively.
Figure 7:
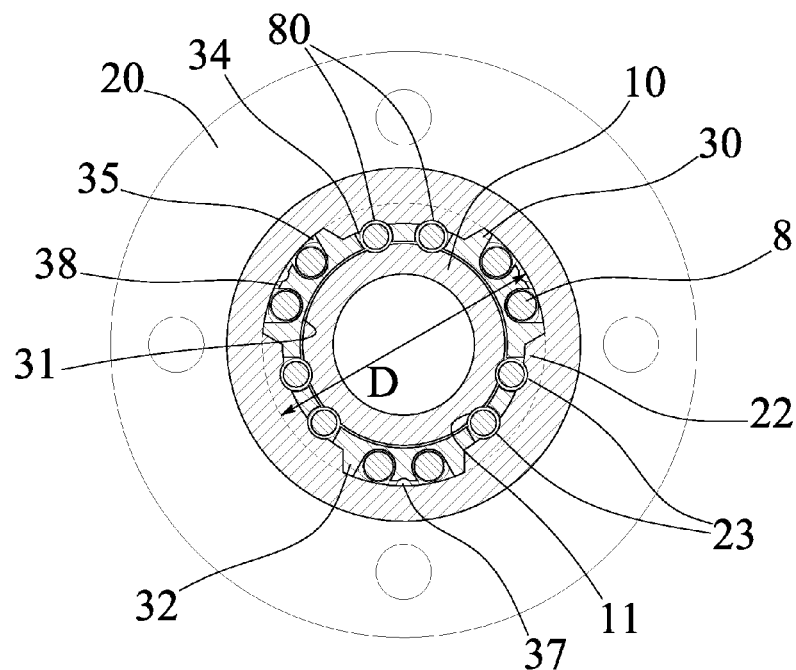
Figure 8:
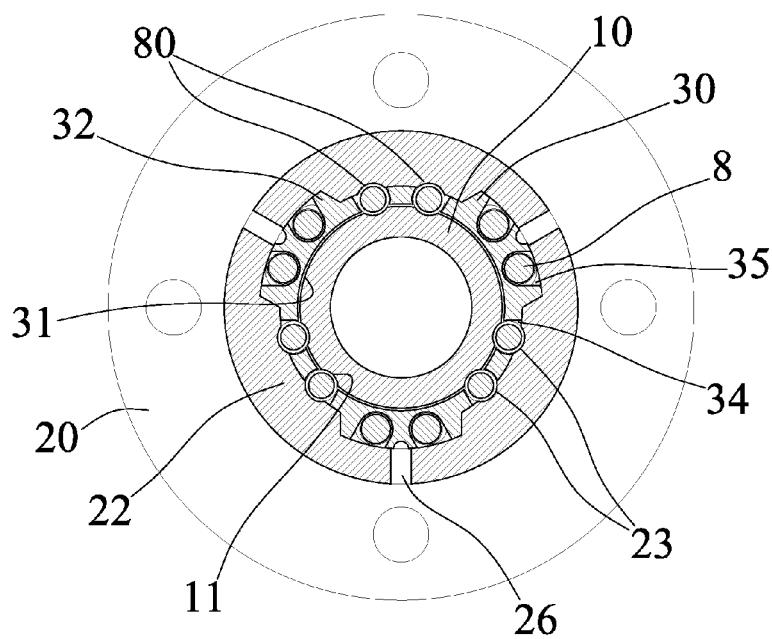
Figure 9:
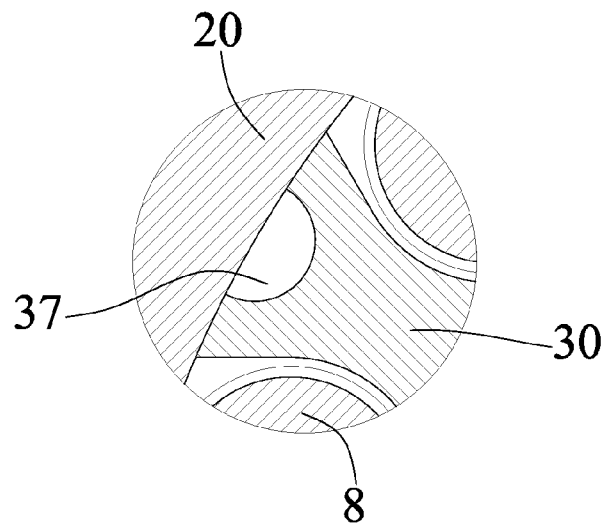
FIGS. 9, 10, 11 are enlarged partial cross sectional views of the ball spline device as shown in FIGS. 6, 7, and 8 respectively.
Figure 10:
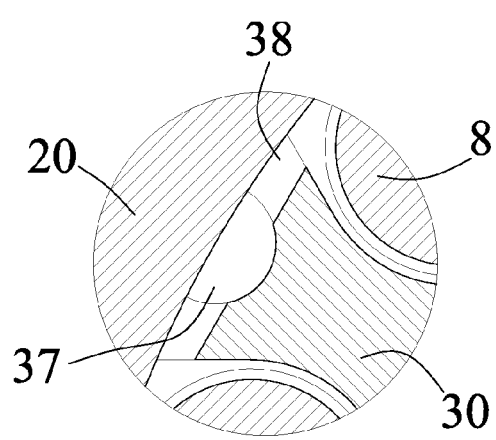

As also shown in FIGS. 6-8, the first longitudinal groove portions 34 of the cylindrical member 30 are communicating with the compartment 31 of the cylindrical member 30 and faced or directed toward and aligned with and communicating with the ball rolling passages 80 and/or the recesses 23 of the sliding member 20 and the longitudinal channels 11 of the guide rail 10 respectively for slidably receiving or engaging with the ball bearing members 8, and the second longitudinal groove portions 35 of the cylindrical member 30 are formed and located in the protrusions 32 and are spaced or separated or offset from the compartment 31 of the cylindrical member 30 and offset from the ball rolling passages 80 and/or the recesses 23 of the sliding member 20 and the longitudinal channels 11 of the guide rail 10, but communicating with the first longitudinal groove portions 34 and the curved communicating groove portion 36 of the cylindrical member 30 for slidably receiving or engaging with the ball bearing members 8.

The cylindrical member 30 further includes one or more (such as three) longitudinal slots 37 formed therein, such as formed in the protrusions 32 of the cylindrical member 30 respectively (FIGS. 5-11), and one of the longitudinal slots 37 of the cylindrical member 30 is aligned with or communicating with the inlet or entrance 26 of the sliding member 20 (FIGS. 5, 8, 11) for receiving the lubricant or lubricating oil or fluid from the entrance 26 of the sliding member 20, and the cylindrical member 30 further includes one or more lateral communicating passageways 38 formed therein, such as formed in the protrusions 32 of the cylindrical member 30 respectively (FIGS. 4, 5, 7, 10) and intersected or communicating with the longitudinal slots 37 and the second longitudinal groove portions 35 of the curved guiding pathways 33 of the cylindrical member 30 respectively and for applying or sending or filling or supplying the lubricant or lubricating oil or fluid into the longitudinal slots 37 and the second longitudinal groove portions 35 of the curved guiding pathways 33 of the cylindrical member 30.

It is preferable, but not necessary that the deflecting device 40 also includes one or more (such as three) longitudinal slots 44 formed therein, such as formed in the protrusions 42 of the deflecting device 40 respectively and aligned with or communicating with the longitudinal slots 37 of the cylindrical member 30 respectively, and the length (L, FIGS. 4, 5) of the cylindrical member 30 and the deflecting device 40 is greater than or no less than the length (H) of the longitudinal slots 37, 44 of the cylindrical member 30 and the deflecting device 40 in the range of about 40-97%. As shown in FIG. 6, the longitudinal slots 37 of the cylindrical member 30 are located at a distance away from the center (0) of the guide rail 10, and each include a width occupying an included angle (A) relative to the guide rail 10 in the range of about 2-30 degrees.

Figure 11:
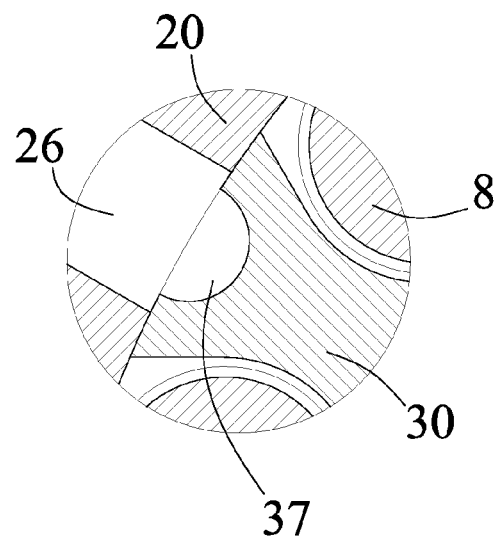

In operation, as shown in FIGS. 5, 8, 11, the lubricant or lubricating oil or fluid may be filled or applied or supplied from the entrance 26 of the sliding member 20 into longitudinal slots 37 of the cylindrical member 30 respectively, and then through the lateral communicating passageways 38 of the protrusions 32 of the cylindrical member 30, and then into the second longitudinal groove portions 35 of the cylindrical member 30 for suitably and effectively applying or sending or filling or supplying the lubricant or lubricating oil or fluid into the guiding pathways 33, 43 of the cylindrical member 30 and the deflecting device 40 respectively and for allowing the ball bearing members or device 8 to be suitably lubricated with the lubricant or lubricating oil or fluid.

Accordingly, the ball spline device in accordance with the present invention includes a lubricating mechanism for suitably and uniformly applying or sending or filling or supplying the lubricant or lubricating oil or fluid to various portions or positions or locations, particularly the endless ball guiding passage or the moving pathway of the ball bearing members and for suitably lubricating or greasing the ball bearing members of the ball spline device.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

We claim:
1. A ball spline device comprising:
an elongated guide rail including a plurality of longitudinal channels formed therein,
a sliding member including a bore formed therein for receiving and engaging with said guide rail, and including a plurality of swellings extended radially and inwardly into said bore of said sliding member and equally spaced from each other, and including a plurality of longitudinal recesses formed in said swellings and communicating with said bore of said sliding member and aligned with said longitudinal channels of said guide rail,
a cylindrical member and a deflecting device engaged between said sliding member and said guide rail, and said cylindrical member and said deflecting device each including a compartment formed therein for slidably receiving said guide rail and for allowing said cylindrical member and said deflecting device to be moved along said guide rail, said cylindrical member and said deflecting device each including a plurality of protrusions extended radially and outwardly therefrom and equally spaced from each other and engaged between said swellings of said sliding member, said cylindrical member and said deflecting device each including a plurality of curved guiding pathway formed therein, and said curved guiding pathways of said cylindrical member and said deflecting device being communicating with each other for forming a plurality of endless ball guiding passages in said ball spline device, and
a plurality of ball bearing members engaged in said endless ball guiding passages, and
said cylindrical member including a slot formed in each of said protrusions of said cylindrical member, and said cylindrical member including a lateral communicating passageway formed in said protrusions and communicating with said slots and said curved guiding pathways of said cylindrical member, and said cylindrical member including an entrance formed therein and communicating with one of said slots of said cylindrical member for supplying a lubricating fluid into said slots and said curved guiding pathways of said cylindrical member.
2. The ball spline device as claimed in claim 1, wherein said curved guiding pathways of said cylindrical member each include a first longitudinal groove portion and a second longitudinal groove portion, and a curved communicating groove portion communicating with said first and said second longitudinal groove portion respectively, said first longitudinal groove portion of said cylindrical member is communicating with said compartment of said cylindrical member and aligned with and communicating with said recesses of said sliding member and said channels of said guide rail respectively for slidably receiving and engaging with said ball bearing members, and said second longitudinal groove portions of said cylindrical member is formed and located in said protrusions and offset from said compartment of said cylindrical member and offset from said recesses of said sliding member and said channels of said guide rail, and communicating with said first longitudinal groove portions and said curved com- municating groove portion of said cylindrical member for slidably receiving and engaging with said ball bearing members.

3. The ball spline device as claimed in claim 1, wherein said sliding member includes two retaining rings engaged in end portions of said sliding member respectively and engaged with said cylindrical member and said deflecting device for retaining and positioning said cylindrical member and said deflecting device in said sliding member.

4. The ball spline device as claimed in claim 1, wherein said deflecting device includes a slot formed in each of said protrusions of said deflecting device and aligned with said slot of said cylindrical member, and said cylindrical member and said deflecting device include a length (L) greater than a length (H) of said slot of said cylindrical member and said deflecting device in a range between 40-97%.

5. The ball spline device as claimed in claim 1, wherein said slots of said cylindrical member are located at a distance away from said center (O) of said guide rail, and each slot of said cylindrical member include a width occupying an included angle (A) relative to said guide rail in a range between 2-30 degrees.

6. The ball spline device as claimed in claim 1, wherein said cylindrical member include a length greater than a length of the deflecting device.

\* \* \* \* \*